United States Patent [19]
Iijima

[11] 3,899,940
[45] Aug. 19, 1975

[54] CHANGE-SPEED TRANSMISSION FOR PASSENGER AUTOMOBILE
[75] Inventor: Tetsuya Iijima, Tokyo, Japan
[73] Assignee: Nissan Motor Co., Ltd., Yokohama, Japan
[22] Filed: June 18, 1974
[21] Appl. No.: 480,471

[30] Foreign Application Priority Data
June 29, 1973 Japan.................................. 48-72863

[52] U.S. Cl. ................................................. 74/759
[51] Int. Cl.² ........................................ F16H 57/10
[58] Field of Search ............................ 74/759, 758

[56] References Cited
UNITED STATES PATENTS
3,593,599  7/1971  Dach.................................. 74/759 X
3,678,784  7/1972  Lemieux ................................ 74/759

Primary Examiner—Samuel Scott
Assistant Examiner—John Reep

[57] ABSTRACT

A planetary change-speed transmission capable of four forward speeds and a reverse with two basic planetary gear units and a dual-pinions planetary gear unit.

5 Claims, 7 Drawing Figures

CHANGE-SPEED TRANSMISSION FOR PASSENGER AUTOMOBILE

The present invention relates to a change-speed transmission for passenger automobiles, giving four forward speeds and a reverse, comprising a compound gear train constructed of planetary gear units.

A variety of four speed transmission have thus far been proposed to obtain gear ratios suitable for passenger automobiles. Since gear ratios are based on the primary configuration of the planetary gear unit, the intervals between the adjacent gear ratios are generally limited to basic values. Such restrictions become more serious where the design of individual planetary gear units is standardized based on the standpoints of cost reduction and production simplicity.

It is an object of the present invention to provide a four-speed transmission comprising planetary gear units, which transmission gives gear ratios suitable for passenger automobiles.

The above object and features of the present invention will become apparent from the following description taken in conjunction with the accompanying drawings, in which.

Figure 1:
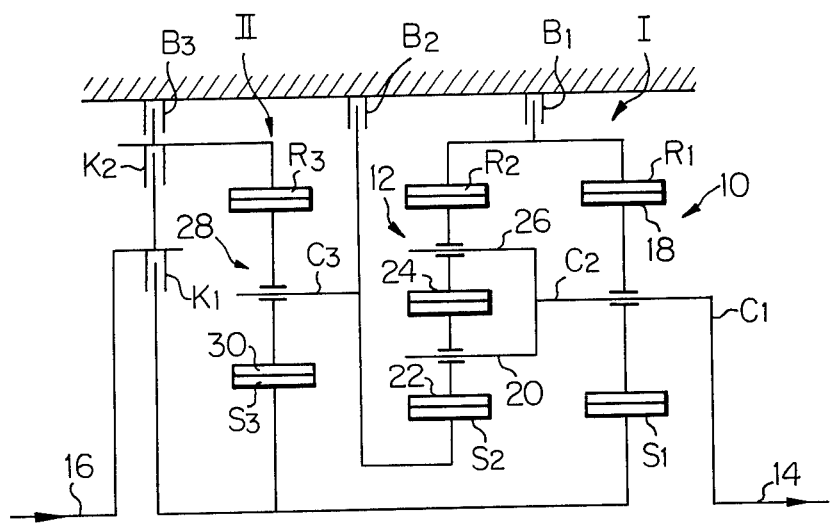
FIG. 1 is a schematic view of an upper half of a first preferred embodiment of a four-speed transmission according to the present invention.
Figure 4:
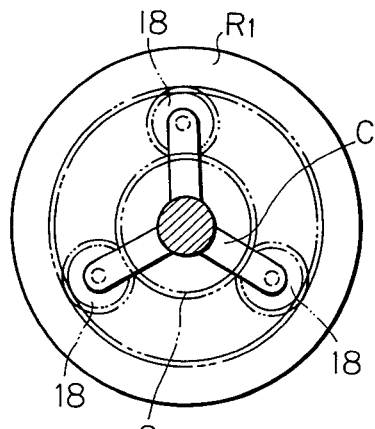
FIG. 4 is a front end view of a representative example of a basic planetary gear unit incorporated in FIG. 1.
Figure 5:
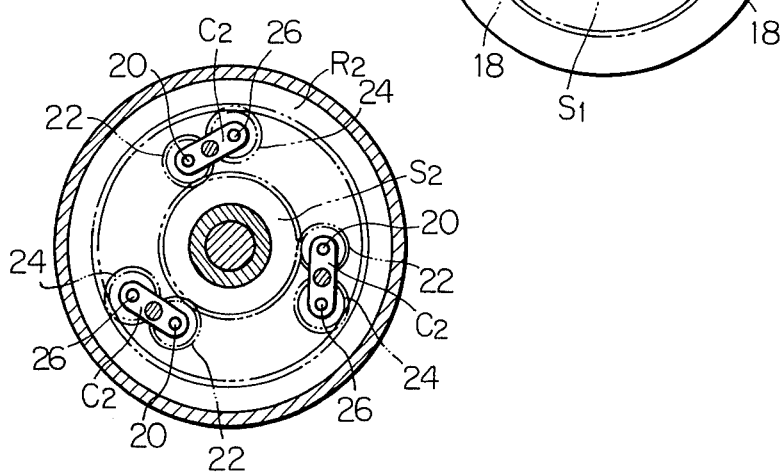
FIG. 5 is a front end view of a representative example of a dual-pinions planetary gear unit incorporated in FIG. 1.

In FIG. 1 there is shown a transmission which comprises first and second groups I and II of planetary gear units. The first group I consists of a basic planetary gear unit 10 as shown in FIG. 4 and a dual-pinions planetary gear unit 12 as shown in FIG. 5. The basic planetary gear unit 10, whose carrier $C_1$ constitutes an output 14 and is connected to a carrier $C_2$ of the dual-pinions planetary gear unit 12. Annular wheel or ring gear $R_1$ of the unit 10 is directly connected to annular wheel or ring gear $R_2$ of the unit 12 and can be braked by a first brake $B_1$. Sun wheel or sun gear $S_1$ of the unit 10 can be connected by a forward clutch or first clutch $K_1$ to input drive 16 which is connected to turbine of the torque converter, the impeller of which being connected to and driven by an internal combustion engine of a passenger automobile. Sun wheel or sun gear $S_2$ of the dual-pinions planetary gear unit 12 can be braked by second brake $B_2$. The basic planetary gear unit 10 includes three planetary pinions 18 rotatably journaled on the carrier $C_1$ which mesh with the ring gear $R_1$ and the sun gear $S_1$, as shown in FIG. 4. The dual-pinions planetary gear unit 12 includes planet pinion shafts 20 carried by carrier $C_2$ and three planet pinions 22 journaled rotatably upon shafts 20 so that they mesh with the sun gear $S_2$. Pinions 22 mesh with other pinions 24 which also are journaled by means of pinion shafts 26 on the carrier $C_2$. Pinions 24 mesh with the ring gear $R_2$.

The second group II consists of a basic planetary gear unit 28, whose carrier $C_3$ is connected to the sun wheel $S_2$ and thus can be braked by the brake $B_2$. Sun wheel or sun gear $S_3$ of the planetary gear unit 28 is connected to the sun wheel $S_1$ and thus can be connected by the clutch $K_1$ to input drive 16. Annular wheel or ring gear $R_3$ of the planetary gear unit 28 can be braked by brake $B_3$ and can be connected to input drive 16 by reverse or second clutch $K_2$. The basic planetary gear unit 28 includes planet pinions 30 rotatably journaled on the carrier $C_3$. All the three planetary gear units 10, 12 and 28 are aligned with input drive 16 and output 14.

Figure 3:
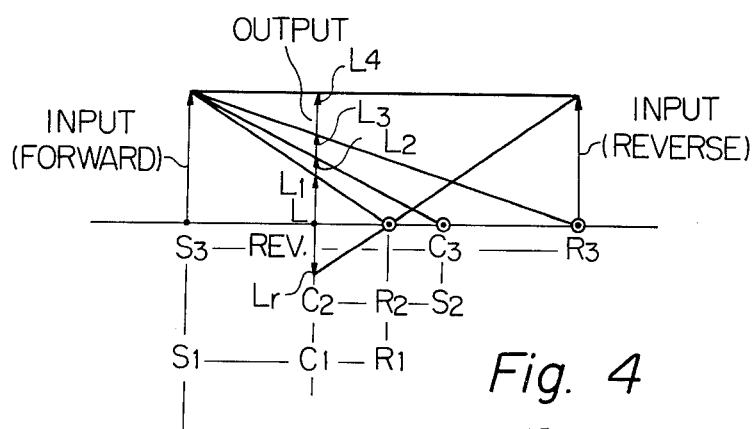
FIG. 3 is a speed chart of the four-speed transmission shown in FIG. 1 or FIG. 2.

The change-speed transmission thus far described is controlled in the following manner: for all the forward speeds, the clutch $K_1$ is engaged. First speed is obtained when, in addition, the brake $B_1$ is engaged and output speed delivered to the output 14 is indicated as a vector $LL_1$ (see FIG. 3). For second speed, the brake $B_2$ is engaged and output speed delivered to the output 14 is indicated as a vector $LL_2$ as shown in FIG. 3. For the third speed, the brake $B_3$ is engaged and output speed delivered to the output 14 is indicated as a vector $LL_3$ (see FIG. 3). For fourth speed, the clutch $K_2$ is engaged and output speed delivered to the output 14 is indicated as a vector $LL_4$ which is same as input speed on the input drive 16. For reverse, the clutch $K_2$ is engaged and the brake $B_1$ is engaged and output speed delivered to the output 14 is indicated as a vector $LL_r$ in FIG. 3.

TABLE

|  | $K_1$ | $K_2$ | $B_1$ | $B_2$ | $B_3$ |  | Gear Ratio |
|---|---|---|---|---|---|---|---|
| 1st Speed | X |  | X |  |  | $\dfrac{1+a_1}{a_1}$ | 3.22 |
| 2nd Speed | X |  |  | X |  | $\dfrac{a_1+a_2}{a_1}$ | 2.00 |
| 3rd Speed | X |  |  |  | X | $\dfrac{a_1+a_2+a_1\cdot a_3+a_2+a_3}{a_1+a_1\cdot a_3+a_2+a_3}$ | 1.48 |
| 4th Speed | X | X |  |  |  | 1 | 1.00 |
| Rev. |  | X | X |  |  | $-\dfrac{a_1-a_1\cdot a_3+a_1\cdot a_3+a_2\cdot a_3}{a_1\cdot a_3}$ | −3.67 |

The sequence for the engagement and disengagement or release of the various clutches and brakes in the change speed gear of FIG. 1 is illustrated in the above Table. The gear ratios are calculated on the assumption that $a_1=a_2=0.45$ and $a_3=0.55$, where: $a_1$ is the ratio of the number of teeth of the sun gear $S_1$ to that of the ring gear $R_1$; $a_2$ the ratio of the number of teeth of the sun gear $S_2$ to that of the ring gear $R_2$; and $a_3$ the ratio of the number of teeth of the sun gear $S_3$ to that of the ring gear $R_3$.

Although the gear ratios can be calculated by the equations in the chart, the same may be obtained with the aid of a speed chart as is familiar to those skilled in the art. FIG. 3 is such a speed chart which visually indicates the reduction speeds achieved by the change speed gear of FIG. 1 when the clutches and brakes are engaged or disengaged in accordance with the patterns shown in the above chart. To more clearly understand the graph of FIG. 3, reference can be made to U.S. Pat. No. 3,701,293 or U.K. Pat. No. 1,308,001 or German OLS 2021368.

Figure 2:
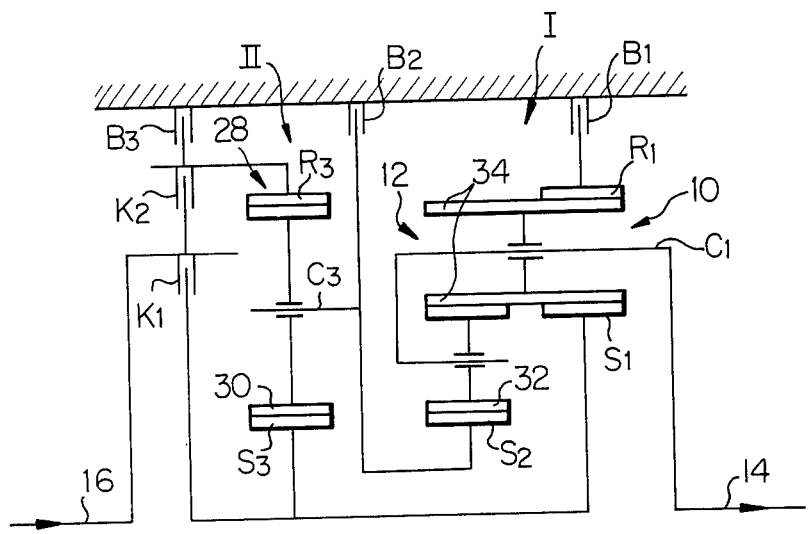
FIG. 2 is a similar view illustrating a second embodiment according to the present invention.

In FIG. 2, the second group II is as in FIG. 1. Its annular wheel or ring gear $R_3$ is again connected to the clutch $K_2$ and brake $B_3$. The carrier $C_3$ is again connected to brake $B_2$ and the sun wheel or sun gear $S_3$ is again connected to the clutch $K_1$.

In the first group I two planet wheels or planet pinions 32 and 34 which mesh with each other are arranged on a common carrier $C_1$ which forms the output 14. A sun wheel or sun gear $S_2$ meshes with the planet pinions 32. The sun wheel $S_2$ provides the drive for reverse gear and is connected to the carrier $C_3$ of the second group II. The planet pinion 34 is lengthened and meshes with sun gear $S_1$ and ring gear $R_1$, which provides the drive for the forward gears and is connected to the clutch $K_1$. An annular wheel $R_1$ also meshes with the planet wheels 34. The brake $B_1$ acts on the ring gear $R_1$.

This gear is controlled in the manner described above in connection with FIG. 1.

Figure 6:
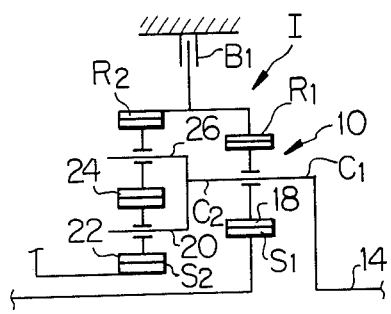
FIG. 6 is a fragmentary view illustrating a modified portion of the transmission shown in FIG. 1.

In FIG. 6 the diameter of the ring gear $R_1$ is reduced and the sun gear $S_1$ diameter is increased as compared to the basic planetary gear unit 10 of the first group I as illustrated in FIG. 1. Thus a larger value is obtained for $a_1$ compared to the case of the gear in FIG. 1, and the gear ratio for the first gear is increased.

Figure 7:
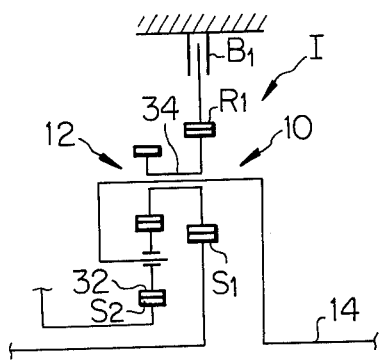
FIG. 7 is a similar view to FIG. 6 and illustrates a modified portion of the transmission shown in FIG. 2.

In FIG. 7 each planet wheel 34 has a larger diameter portion and smaller diameter portion. The larger diameter portion meshes with the sun gear $S_1$ and the ring wheel $R_1$.

Since the torque which is transmitted by the clutches will not be exceeded by the torque to the input shaft as will be readily understood from the inspection of the preceding description and the accompanying drawings, the clutches may be relatively small-sized. This is advantageous in making the change-speed transmission compact.

From the inspection of the chart it will be understood that switching operation between any two forward gears can be accomplished by engaging one brake and disengaging another brake. This is advantageous in simplifying the control circuit for the transmission.

What is claimed is:

1. A change-speed transmission for a passenger automobile, comprising a first planetary gear train group having a basic planetary gear unit, the carrier of which serves as an output, the sun wheel of which is connectable to an input by a first clutch, and the annular wheel of which is brakeable by a first brake; and a dual-pinions planetary gear unit, the carrier of which is connected to the carrier of said basic planetary gear unit of said first planetary gear train group for simultaneous rotation therewith, the sun wheel of which is brakeable by a second brake; and a second planetary gear train group having a second basic planetary gear unit, the annular wheel of which is connectable to the input by a second clutch and brakeable by a third brake, the carrier of which is connected to the sun wheel of the dual-pinions planetary gear unit of said first planetary gear train group and is brakeable by the second brake, and the sun wheel of which is connected to the sun wheel of the basic planetary gear unit of said first planetary gear train group and is connectable by the first clutch to the input.

2. A change-speed transmission as claimed in claim 1, wherein the annular wheel of the dual pinions planetary gear unit is connected to the annular wheel of said basic planetary gear unit for simultaneous rotation therewith.

3. A change-speed transmission as claimed in claim 1, wherein the annular wheel of the first planetary gear unit of said first planetary wheel train group serves as the annular wheel of the dual-pinions planetary gear unit of said first planetary wheel train group.

4. A change-speed transmission as claimed in claim 2, wherein the annular wheel of the basic planetary gear unit of said first planetary wheel train group is different in diameter from the annular wheel of the dual-pinions planetary gear unit of said first planetary wheel train group.

5. A change-speed transmission as claimed in claim 3, wherein the sun wheel of the simple planetary gear unit of said first planetary wheel train group is different in diameter from the sun wheel of the dual-pinions planetary gear unit of said first planetary wheel train group.

* * * * *